United States Patent [19]

Binzen

[11] Patent Number: 5,302,071
[45] Date of Patent: Apr. 12, 1994

[54] DUST CONTAINMENT SYSTEM FOR BOTTOM DUMPING RAILROAD CARS

[75] Inventor: Willard Binzen, Saratoga Springs, N.Y.

[73] Assignee: Svedala Industries, Inc., Pittsburgh, Pa.

[21] Appl. No.: 751,880

[22] Filed: Aug. 28, 1991

[51] Int. Cl.⁵ .................... B65G 65/34; B65G 69/18
[52] U.S. Cl. .................. 414/376; 414/291; 414/373
[58] Field of Search ............ 414/373, 376, 291; 454/49, 66; 104/51; 105/29

[56] References Cited

U.S. PATENT DOCUMENTS

| | | | |
|---|---|---|---|
| 3,901,419 | 8/1975 | Szendroi | 414/376 X |
| 3,909,223 | 9/1975 | Schmidt | 454/49 X |
| 4,241,517 | 12/1980 | Carpenter | 414/291 X |
| 4,484,563 | 11/1984 | Fritz et al. | 55/DIG. 36 X |
| 4,609,321 | 9/1986 | Binzen | 414/291 |
| 4,655,401 | 4/1987 | Binzen et al. | 241/69 |
| 4,699,187 | 10/1987 | Binzen | 141/5 |
| 4,714,097 | 12/1987 | Binzen et al. | 141/5 |
| 4,737,269 | 4/1988 | Bischoff | 414/291 X |
| 4,946,018 | 8/1990 | Binzen et al. | 193/25 C |
| 5,020,470 | 6/1991 | West et al. | 454/49 X |

FOREIGN PATENT DOCUMENTS

| | | | |
|---|---|---|---|
| 3306675 | 8/1984 | Fed. Rep. of Germany | 414/291 |
| 0895856 | 1/1982 | U.S.S.R. | 414/291 |
| 1154185 | 5/1985 | U.S.S.R. | 414/376 |
| 1370039 | 1/1988 | U.S.S.R. | 414/291 |
| 1458598 | 2/1989 | U.S.S.R. | 414/291 |
| 2222705 | 3/1990 | United Kingdom | 454/49 |

Primary Examiner—Michael S. Huppert
Assistant Examiner—Stephen Gordon
Attorney, Agent, or Firm—Webb, Burden, Ziesenheim & Webb

[57] ABSTRACT

Fugitive dust generated by a bottom dumping railroad hopper car is captured by a dust containment system. The dust containment system includes an open railroad track segment for supporting the car above a hopper pit defined by enclosed end walls, an interconnecting rear sidewall and a partially open front side. A building structure encloses the track segment and hopper pit and includes roof mounted ventilators for emitting fresh air to the interior thereof. A backhoe device is positioned above the car to assist in discharging material. Air passageways are formed on opposite sides of the track segment with motorized dampers positioned therein. Dust collector units are positioned adjacent to the front side of the hopper pit. The fans of the dust collectors induce a draft from the roof ventilators downwardly along the sides of the rail car, through the air passageways to the hopper pit. The downwardly flowing fresh air provides a clean work environment for the backhoe operator as well as for the personnel opening and closing the gates of the hopper car. Fugitive dust is prevented from moving upwardly out of the hopper pit by virtue of the downwardly flowing, high velocity air stream. Fugitive dust is entrained in the air stream and captured by the dust collectors. A second building structure encloses an area around the open front side of the hopper pit to contain the dust generated during unloading operations.

18 Claims, 5 Drawing Sheets

DUST CONTAINMENT SYSTEM FOR BOTTOM DUMPING RAILROAD CARS

BACKGROUND OF THE INVENTION

The present invention relates generally to dust control apparatus and methods for controlling airborne particulate emissions generated during bulk material dumping operations. More particularly, the invention relates to a dust containment system for controlling and capturing airborne emissions from bottom dumping railroad cars when discharging dusty bulk materials, such as, for example, fly ash.

Fly ash is generated in large quantities as a waste product collected from stack gases in coal fired power plants. The fly ash is commonly transported by hopper type railroad cars from the power plant to a remote disposal site. The hopper cars are bottom dumped into a three-sided bunker having a partially open front side to permit access by a front end loader. The dumped fly ash is then loaded onto trucks for transport to a landfill disposal site. The fly ash generates tremendous amounts of billowing dust clouds when it is discharged from the hopper cars and also during handling by the front end loader. If unchecked, the fugitive dust escapes into the surrounding environment causing unacceptable air pollution levels.

In addition, the fly ash, even though transported in tarpaulin covered hopper cars, may become wetted and/or partially frozen during rail transport to the dumping site. As a result, the flow characteristics of the as received fly ash varies considerably depending upon the moisture content and ambient temperatures to which it was exposed during rail transport. It is, therefore, necessary at the dump site to employ a powered backhoe and operator stationed above the open hopper car to mechanically assist the flow out of the rail car. Additional personnel are located beneath the hopper car to open and close the gate doors which permits the particulate material to flow from the car. It is readily appreciated that the backhoe operator and hopper car gate operators are positioned in an extremely dusty area above the open car which creates a most unsatisfactory and potentially unhealthy work environment.

It is, therefore, an object of the present invention to overcome the problems of containing fugitive dust encountered in dumping fly ash and like dusty particulate materials from bottom dump railway cars. The present invention solves these problems by providing a dust containment system which contains and captures the particulate airborne pollutants generated during bottom car dumping and subsequent front end loading operations. In addition, the dust containment system of the present invention creates a continuous draft of clean air above the hopper car to provide a virtually dust free work environment for the backhoe operator.

Still further, the dust containment system of the present invention provides an enclosure and controlled air draft around the rail car and within the hopper pit to contain and capture airborne particulates within the enclosure so as to prevent its escape into the surrounding environment. This is accomplished without the need for a separate dust collector building, extensive ducting, powerful fans and like expensive equipment commonly found in prior air pollution control installations.

SUMMARY OF THE INVENTION

Briefly stated, the present invention is directed to a dust containment system for controlling dust emissions generated by discharging particulate materials from bottom dump railway cars. The invention comprises an enclosing building structure constructed around a railroad track segment positioned above a hopper pit area. The building structure includes a roof having at least one ventilator therein to permit the ingress of fresh air into the building structure. Sidewalls are positioned on opposite sides of the tracks, each sidewall includes an air deflector plate extending downwardly from a position near the roof to a floor level location and closely spaced from the rail car to define an air pathway therealong. An open grating extends on the floor on each side of the track segment defining an air passageway above the hopper pit to permit air to flow from each side of the car into the hopper pit. A motorized damper is positioned at each passageway to regulate the volumetric air flow rate on each side of the rail car. Air ducts extend beneath the track segment from the rear of the hopper pit to the front to allow air flow from the rear side of the car when the hopper pit is filled with particulate material. The hopper pit is positioned below the track segment and comprises two spaced end walls running transverse to the track segment and a rear sidewall connecting the two end walls and a partially open front side to permit access by a front end loader or the like for removal of the dumped particulate material. Conventional type conveyor systems can be used as well. The rails of the track segment are supported on an open beam system comprising a plurality of longitudinally extending members which, in turn, are supported by the end walls of the hopper pit and by an intermediate wall extending transversely beneath the track across the central area of the hopper pit. A pair of plates and pivotal hopper gates are mounted across the open front side of the hopper pit, extending from the end walls to the intermediate wall to contain the particulate material in the hopper pit during dumping. The hopper gates are swung or slid upwardly after dumping to allow full access by the front end loader.

A fixed curtain of air impervious material extends downwardly a distance across the open face of the pit to direct the air path downwardly beneath the fixed curtain and then upwardly to a plurality of dust collector devices spaced from the fixed curtain. A moveable air impervious curtain is positioned at a rear area of the dust collection devices to isolate the dust collectors from the rear of the building during dumping operations so as to avoid the creation of secondary air streams. The dust collectors are of the automatic reverse, air jet type which periodically clean the filter media with a back flow of compressed air. The filters of the dust collectors communicate with one or more fans which generate an induced draft of air flow into the collectors. The induced air draft commences at the roof ventilators and flows downwardly along the pathways defined by the air deflection plates on opposite sides of the railway car into the air passageways and the hopper pit/ducts and to the dust collectors. The induced draft of clean air from the roof ventilators creates and maintains a dust free work environment for the operator of a backhoe device positioned above the open hopper car and for the personnel opening and closing the hopper car gate doors. Filtered, clean air is emitted to the atmosphere while the collected dust is recovered on site for disposal with the balance of the dumped material.

A second building enclosure is integrally attached to the open front area of the hopper pit and includes one or more vertically moveable access doors for entry and exiting of the front end loader and trucks. During dumping operations, the access doors are completely closed to insure primary air flow from the roof ventilators rather than from the doors. After the car is dumped and truck loading is to commence, the access doors are opened slightly to permit air flow through the access doors to the dust collectors so as to contain and capture fugitive dust generated by the front end loader. Motorized louver-type dampers are also provided to further control the air draft in the second building structure.

BRIEF DESCRIPTION OF THE DRAWINGS

The above objects and advantages of the invention, as well as others, will become readily apparent when reference is made to the following detailed description, taken in conjunction with the appended drawings, in which.

DETAILED DESCRIPTION OF THE INVENTION

Figure 1:
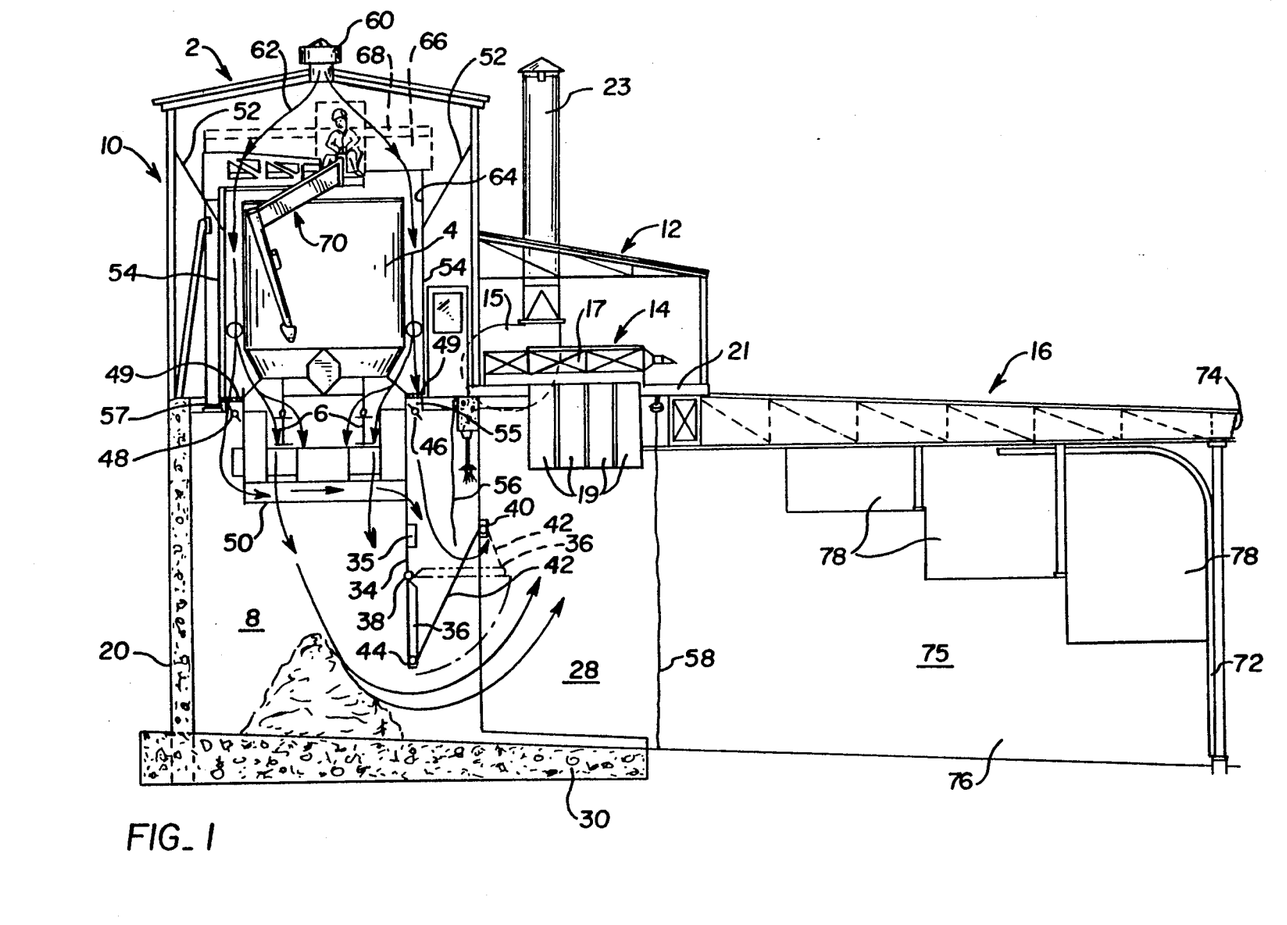
FIG. 1 is a cross-sectional side elevation view of the dust control system of the invention, showing a bottom dump railway car in place therein.
Figure 2:
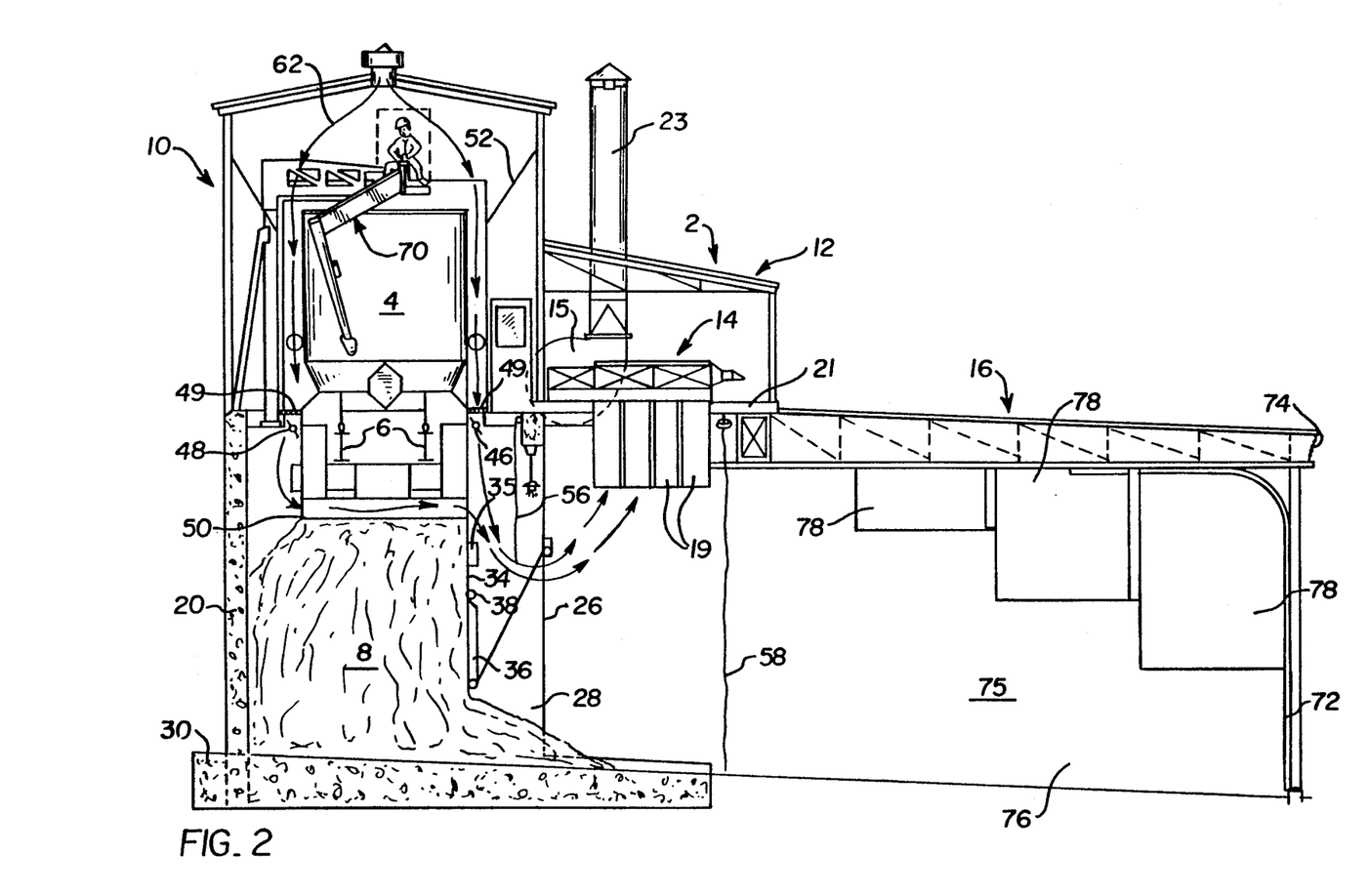
FIG. 2 is similar to FIG. 1 showing the hopper pit area filled with particulate material.
Figure 3:
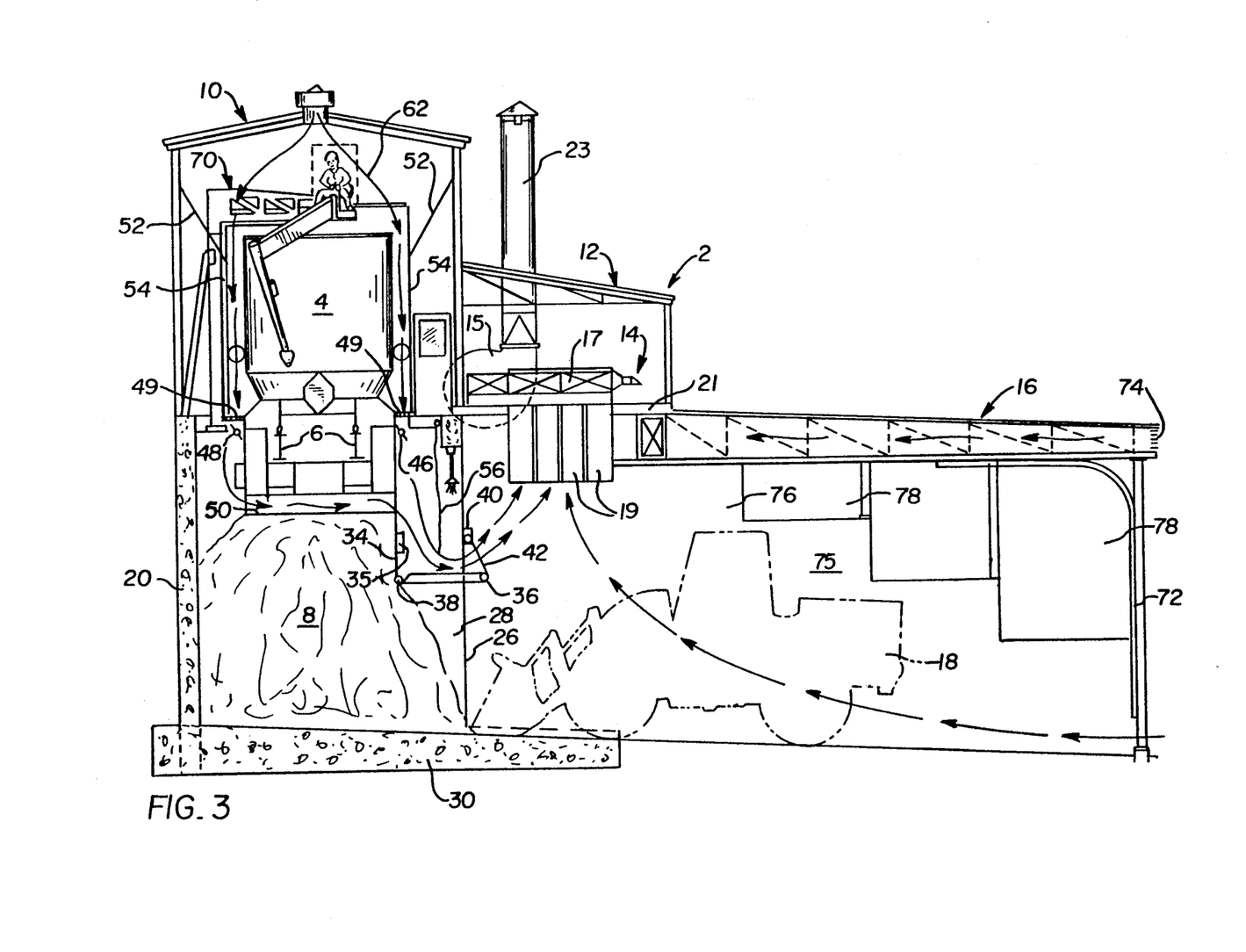
FIG. 3 is similar to FIGS. 1 and 2 showing a front end loader in phantom lines in place thereon.

The dust containment system of the present invention, generally designated by reference numeral 2, is depicted in various stages of operation in FIGS. 1-3. A bottom dumping railroad car, such as a hopper car 4, is situated on a railroad track segment 6 above an open hopper pit 8. A building structure 10 encloses the car 4 above the hopper pit 8 to contain the fugitive dust generated during dumping as well as to direct a desired flow pattern of air around the car and through the hopper pit area to capture the dust, as will be explained in greater detail hereinafter. A structure 12 is attached to the containment structure 10 and encloses a plurality of dust collection units 14 therein. An extended building structure 16 extends outwardly from the structures 10 and 12 to define a material handling station therein for removing the particulate material by way of a front end loader 18 or the like, for subsequent loading onto trucks, see FIG. 3. Building structure 16 may include conveyor belts (not shown) and the like to aid in loading the trucks and will further contain any dust generated in such subsequent operations.

Figure 4:
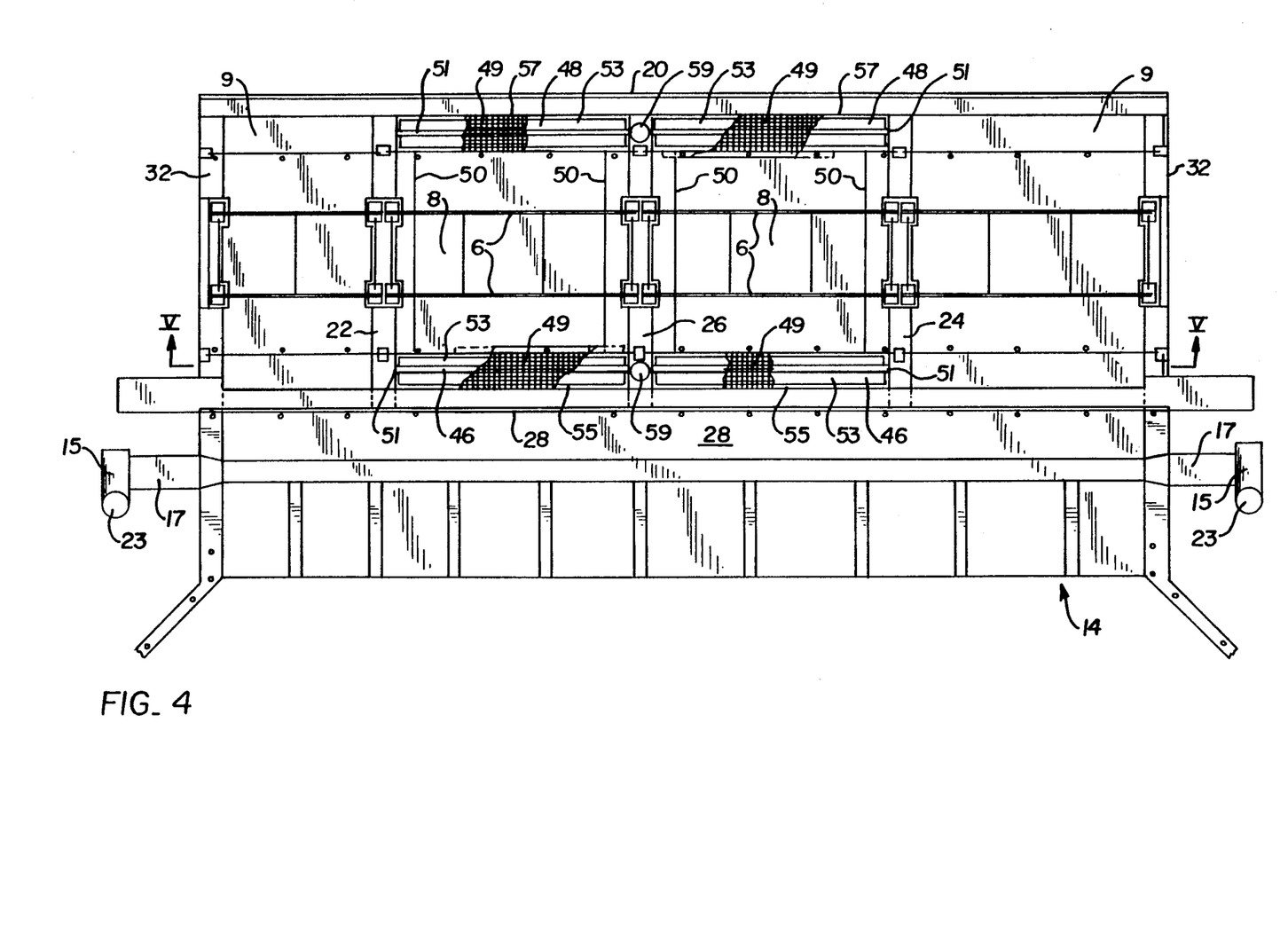
FIG. 4 is a plan view of the railroad track segment above the hopper pit.
Figure 5:
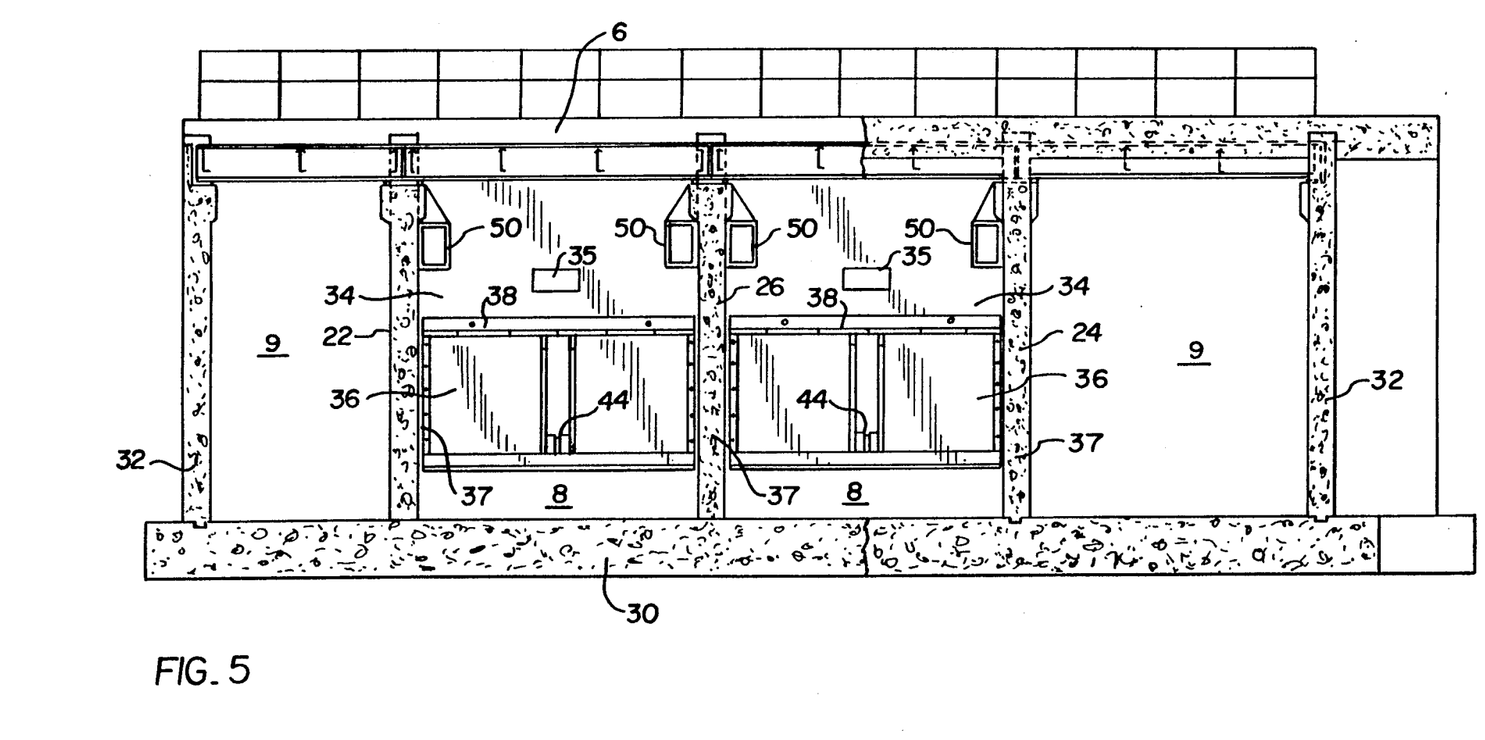
FIG. 5 is a cross-sectional front elevation view taken along line V—V of FIG. 4 showing a pair of swingable hopper gates.

As seen in the drawings, and particularly FIGS. 4 and 5, the hopper pit 8 is defined by a three-walled, bunker-like structure of concrete or the like comprising a rear wall 20, two end walls 22 and 24, with a supporting wall 26 spaced intermediate the end walls. The front side 28 of the hopper pit 8 is partially or substantially open, allowing access for the front end loader 18. A concrete slab 30 provides a floor for the hopper pit 8 and forms a base for the vertical walls 20, 22, 24 and 26. A pair of outer end walls 32 complete the bunker structure but do not form a portion of the hopper pit 8 since the closed bays 9 defined thereby do not receive any dumped material, see FIG. 4. The railroad track segment 6 is supported on elongated members which, in turn, are supported by the walls 22-26. The rail segment 6 between the walls 22 and 24 above the hopper pit 8 is open to permit particulate material being discharged from the car 4 to fall between the rails and into the hopper pit 8. The area beneath the rail segment above the bays 9 is closed off.

A pair of plates 34 enclose the open front sides of the hopper pit 8 extending longitudinally from the intermediate wall 26 to each end wall 22, 24 and vertically from the track area downwardly to a position spaced above the slab floor 30. If required, the plates 34 may include a vibrator device 35 to insure that the particulate material does not adhere to the surfaces thereof. A swingable hopper gate 36 is pivotally attached to each of the hopper plates 34 by way of a hinge member 38. The hopper gate 36 is positioned along a vertical plane, as shown in FIGS. 1 and 2, while the car is being dumped in order to limit the flow of particulate material out of the hopper pit 8. Material such as fly ash tends to flow easily, and preferably should be contained at the open front side 28. The hopper gates 36 include a border 37 of a flexible material such as rubber, which is boltably connected thereto to engage the sides of walls 24 and 26 to prevent seepage of particulate matter around the edges thereof. After the dumping has been completed, the hopper gate 36 is swung upwardly about hinge 38 as shown in FIG. 3 to permit the front end loader 18 to gain access to the dumped pile within the hopper pit. The hopper gate 36 may be raised and lowered by a motorized winch 40 which moves the gate by way of a rope cable 42, see FIG. 1. A pulley wheel 44, shown in FIG. 5, is rotatably positioned at the lower end of each of the hopper gates 36 to accommodate the rope cable 42.

The hopper pit 8 also includes a plurality of air ducts 50 which extend transversely across the width of the hopper pit 8 beneath the railroad track segment 6 to permit the passage of air from the rear side of the car and the pit to the dust collectors 14. This air flow pattern is required when the hopper pit 8 is filled with particulate material as shown in FIGS. 2 and 3 which necessarily blocks off the air path between the tracks 6 and across the pit.

A pair of motorized dampers 46 and 48 are mounted in air passageways 55 and 57, respectively, at the floor level extending along the sides of the track segment 6. The dampers are positioned above the hopper pit 8 to regulate and balance the flow of air along the sides of the car. The building structure 10 also includes a pair of angularly disposed, air deflecting plates 52 which extend from the sidewalls of the structure 10 to vertical walls 54 which are spaced in close proximity to the sidewalls of the railroad car 4. A plurality of roof ventilators 60 permit the entry of fresh air (indicated by arrows 62) to a closely defined pathway along the sides of the railroad car. High velocity air flows downwardly through the air passageways 55 and 57, occupied by the motorized dampers 46 and 48, through the open trackway segment 6 beneath the rail car and through the hopper pit 8 and/or ducts 50 to the dust collectors 14. An open grating 49 is positioned on the floor above the motorized dampers 46 and 48 to permit air flow therethrough.

The motorized dampers 46 and 48, as seen in FIG. 4, each include a shaft 51 which is journaled for rotation at respective ends in the walls 22, 24 and 26. A pair of elongated flapper plates 53 are carried by each of the shafts 51 to open and close the respective air passageway 55 of damper 46 and the respective air passageway 57 of damper 48 beneath the open floor grates 49. Electric motors 59 are coupled by conventional means to the dampers 46 and 48 to rotate the shafts 51 in order to selectively regulate the induced draft of air flowing through the passageways 55 and 57. Thus, when the pile of particulate material rises and closes off the air flow through the track segment 6, as shown in FIGS. 2 and 3, the rear damper 48 is opened to a greater degree than the front damper 46 in order to equalize or balance the air streams on both sides of the car.

A fixed air impervious curtain 56 is positioned outwardly from the hopper plate 34 to reverse the air flow direction prior to flowing toward the dust collectors 14. A rolling, motorized, air impervious curtain 58 is positioned on an outward side of the dust collectors 14 to confine the air flow within a well-defined space during dumping of the car.

A conventional backhoe mechanism 70, is situated within the building structure 10 with the operator station positioned above the open top of the hopper car 4. The end walls of the building structure 10 include an opening 64 to permit the entry and exit of the railroad car therein. A motorized roll-up door 66 is also positioned to selectively close off the openings 64. A conventional air curtain unit 68 may also be provided at each end of the car to prevent the escape of air from the ends of the structure 10.

As seen in the plan view of FIG. 4, the array of dust collectors 14 extends across the entire width at the front side 28 of the hopper pit 8, including the empty bays 9. A pair of motor driven exhaust fans 15 are connected by appropriate duct work 17 to the plurality of dust collectors 14 induce a draft therethrough. A plurality of fabric covered filter elements 19 extend through a floor 21 in structure 12 to communicate with the space adjacent to the open side 28 of the hopper pit 8. Clean filtered air is exhausted to the atmosphere from the filter units and fans 15 through exhaust stacks 23. The building structure 16 confines the open front side 28 of the hopper pit 8 to contain dust generated by the front end loader and truck loading operations. The building structure 16 includes roll-up access doors 72 which are in a closed position during the car dumping operation so as to prevent fugitive dust from escaping, or the entry of other air drafts, which would disrupt the desired air flow patterns around the railroad car.

In a typical operation, open hopper cars 4 are loaded with fly ash, for example, at a power plant. The cars are covered with a tarpaulin and transported to the dump site in an amount of 30 or more cars per day. The fly ash received has a wide range of flow characteristics due to variable moisture content. Since a full spectrum of flow characteristics can be present from extremely dry to a wet and/or sticky mass, the backhoe 70 is a necessity. By use of the buildings/enclosures 10 and 16, the motorized dampers 46 and 48 as well as the moveable air impervious curtain 58, the operation of the system 2 may be divided into two distinct parts. FIGS. 1 and 2 show the operation as it appears when the hopper car 4 is being dumped and how the system 2 of the invention is configured to contain the first large dust cloud generated when the car discharge doors are opened. The fans 15, communicating with the dust collector units 14, draw fresh air into the area housed by structure 10 through the roof ventilator 60 to thereby protect the operator of the backhoe apparatus 70 and hopper car gate personnel, while also minimizing dust emissions to the outside environment by virtue of the negative pressure developed therein. FIG. 3 shows the second mode of operation which is employed during normal truck loading operations. In this second, loading mode, the primary air flow is from under the roll-up access doors 72 which are opened slightly. A smaller, secondary air flow travels down around the rail car 4 to protect against dust emissions from that area and also provide a suitable operator environment. During initial dumping of the rail car 4, it is preferable to dump upon an existing pile of particulate material rather than on an empty floor in order to minimize unnecessary dust generation.

In operation, during the dumping cycle depicted in FIGS. 1 and 2, outside air enters the building 10 through roof ventilators 60, the draft being induced by the fans 15, moving air through the duct work 17 and fabric filter units 19 of the dust collectors 14. In this mode of operation, air flows down both sides of the hopper car 4 in close proximity thereto by virtue of the inclined directing plates 52 and vertical sidewalls 54. The air stream is partially prevented from flowing down the ends of the hopper car by an air curtain 68 supplied at each end of the car 4. Air is accelerated to about 600 feet per minute by the inclined directing plates 52 located on both sides of the car. The air is pulled downwardly through the track segment 6 and through the grates 49 above the air passageways 55 and 57 containing the motorized dampers 46 and 48 at about 150 feet per minute, picking up fugitive dust in that area. Thus, the downwardly flowing air stream creates a negative pressure above the grates 49 and track segment 6 and prevents the upward escape of dust from the hopper pit 8. When the dumped particulate material fills the hopper pit 8 to a position above the lower edges of the hopper plates 34, air flow through the track area shown in FIG. 1 is halted and the flow pattern of FIG. 2 then exists. At this stage, air flow through the motorized dampers 46 and 48 increases to about 900 feet per minute. The air flow pattern favors the front damper 46 on the dust collector side of the hopper car because of the decreased travel distance on that side. This flow imbalance is compensated by selectively moving the rear damper 48 to a more open position than that of the front damper 46. The air from the rear side of the car travels through the ducts 50 and joins with the front air flow at a combined flow rate of about 350 feet per minute behind the fixed curtain 56. The air flow immediately slows down and flows in a downward direction as it impinges upon the fixed curtain 56 and then reverses direction to flow upwardly toward the collectors 14 at the bottom of the fixed curtain. Heavier dust particles drop out of the air stream due to decreased velocity and changed flow pattern caused by curtain 56. Stray dust generated at the bottom of the pile is picked up by the deflected air stream and carried to the dust collectors 14.

The dust collectors 14 are made up of the clean side sections of a standard dust collector mounted through the sealed floor 21, with the fabric filter portions 19 positioned on the dirty side of the building. The units 14 are commercially available, such as "DALAMATIC" brand dust collectors which are manufactured by DCE, Inc. Each of the filter cells of dust collectors 14 contains hollow fabric filter elements 19 of polyester felt material. The filter elements 19 are periodically cleaned by pulsating a high velocity stream of compressed air therethrough in a conventional backflow manner. The particulate material blown from the filter elements 19 falls to the floor 30 to be removed by the front end loader with the balance of the pile.

The dust collectors 14 eliminate the need for extensive duct work, dust hoppers, screw conveyors, rotary valves, collector balancing systems and the like which are commonly employed in conventional, remotely located dust collection systems. The dust collectors 14 are relatively compact with a minimum amount of duct work and the like. The clean side sections of the dust collectors are mounted through the sealed floor 21 and are connected to the ducts 17 which communicate with the fans 15 as previously described. By way of example, seven dust collection units of two banks with four tiers of filter elements 19 are employed, totaling 14 rows of 40 filter elements each. The polyester felt material preferably employed in the filter elements 19 provides a total filter area of 9,030 square feet. All of the filter elements 19 are cleaned by a continuously timed, reverse air jet system as previously discussed.

The space 75 utilized by the front end loader 18 for emptying the hopper pit and loading trucks is enclosed by the structure 16. The sidewalls of the structure 16 which define the space 75 may include concrete sidewalls 76 and light transparent panels 78 of a glass or opaque plastic material. The structure 16 includes a plurality of motorized louver-style dampers 74 positioned adjacent the roof thereof. The motorized louvers 74 are closed during the car dumping operation of FIGS. 1 and 2 in order to prevent any secondary air draft therethrough. After the car 4 has been dumped, the truck loading operation begins. At that point, the one or more access doors 72 are raised slightly, the motorized curtain 58 is retracted and the louvers 74 are opened to permit a flow of fresh air to pass therethrough to the dust collectors 14, as shown in FIG. 3. The air flow passing through the louvers 74 and through the space beneath the raised door 72 clears the area 75 of fugitive dust generated by the front end loader 18 and keeps the area relatively clear for the operator. When the motorized louvers 74 are closed about 25% and two access doors 72 are each raised above the floor about 12-18 inches, primary air flow through the access doors 72 to the dust collectors 14 is at a rate of approximately 50,000 cubic feet per minute.

In certain situations where the particulate material permits, the building structure 10 surrounding the rail car 4 may be omitted. In such installations, the dust generated during bottom dumping will be contained solely by the influx of air through the passageways 55 and 57. In such an example, however, the structures 12 and 16 would be still employed in order to contain the fugitive dust generated during the dumping and loading operations. Fly ash is generally a very difficult and dusty material and will, in most instances, require the use of the containment building structure 10 surrounding the hopper car in order to prevent the escape of fugitive dust into the surrounding environment and also to provide a healthy and safe work environment for the operator of the backhoe 70.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A dust containment system for a bottom dumping railroad car comprising:
   an open railroad track segment for supporting the bottom dump car;
   a hopper pit situated beneath the track segment and adapted to receive a particulate material dumped from said car, said hopper pit defined by spaced sidewalls, a rear wall and a partially open front side;
   air passageways on opposed sides of the track segment communicating with the hopper pit;
   ventilator means positioned above said track segment to supply a downward flow of air through said air passageways, track segment and hopper pit; and
   dust collection means communicating with the front side of the hopper pit to induce an air draft downwardly from the ventilator means through said trackway segment and air passageways and through said hopper pit whereby fugitive dust generated during dumping is carried by said induced air draft and captured by said dust collection means;
   said containment system further including a building structure around said track segment wherein the building structure comprises end walls, sidewalls, a roof and said ventilator means in said roof to permit an ingress of air flow from the roof downwardly to said open track segment and said passageways; and
   wherein the building structure includes inclined air directing plates with depending vertical walls continuously extending along the sidewalls of the building structure in a spaced relation to the railroad car to define an air flow pathway along the sides of the car to said air passageways.

2. A dust containment system for a bottom dumping railroad car comprising:
   an open railroad track segment for supporting the bottom dump car;
   a hopper pit situated beneath the track segment and adapted to receive a particulate material dumped from said car, said hopper pit defined by spaced sidewalls, a rear wall and a partially open front side;
   air passageways on opposed sides of the track segment communicating with the hopper pit;
   ventilator means positioned above said track segment to supply a downward flow of air through said air passageways, track segment and hopper pit; and
   dust collection means communicating with the front side of the hopper pit to induce an air draft downwardly from the ventilator means through said trackway segment and air passageways and through said hopper pit whereby fugitive dust generated during dumping is carried by said induced air draft and captured by said dust collection means; and
   including a backhoe means including an operator station positioned above the railroad car for selectively accessing bottom portions of the car for aiding the dumping thereof.

3. A dust containment system for a bottom dumping railroad car comprising:

an open railroad track segment for supporting the bottom dump car;

a hopper pit situated beneath the track segment and adapted to receive a particulate material dumped from said car, said hopper pit defined by spaced sidewalls, a rear wall and a partially open front side;

air passageways on opposed sides of the track segment communicating with the hopper pit;

ventilator means positioned above said track segment to supply a downward flow of air through said air passageways, track segment and a hopper pit; and dust collection means communicating with the front side of the hopper pit to induce an air draft downwardly from the ventilator means through said trackway segment and air passageways and through said hopper pit whereby fugitive dust generated during dumping is carried by said induced air draft and captured by said dust collection means; and including duct means extending beneath the track segment in said hopper pit and communicating between a rear side and a front side of the hopper pit to provide an air pathway from a rear air passageway to the front side of said hopper pit when the hopper pit is filled with particulate material.

4. A dust containment system for a bottom dumping railroad car comprising:

an open railroad track segment for supporting the bottom dump car;

a hopper pit situated beneath the track segment and adapted to receive a particulate material dumped from said car, said hopper pit defined by spaced sidewalls, a rear wall and a partially open front side;

air passageways on opposed sides of the track segment communicating with the hopper pit;

ventilator means positioned above said track segment to supply a downward flow of air through said air passageways, track segment and a hopper pit; and dust collection means communicating with the front side of the hopper pit to induce an air draft downwardly from the ventilator means through said trackway segment and air passageways and through said hopper pit whereby fugitive dust generated during dumping is carried by said induced air draft and captured by said dust collection means; and including damper means positioned in said air passageways to permit selective regulation of an air flow rate therethrough.

5. The dust containment system of claim 1 including a second building structure containing a space communicating with the front side of the hopper pit whereby fugitive dust generated during removal of dumped particulate material in said hopper pit is contained within said second building structure and captured by the dust collection means.

6. The dust containment system of claim 5 wherein the hopper pit includes a moveable gate means positioned at a lower portion thereof, said gate means being adapted to contain particulate material within the hopper pit when said gate means is in a closed position and to permit access to said particulate material when the gate means is in a raised position.

7. The dust containment system of claim 5 including a moveable air impermeable curtain positioned at a forward portion of said second building structure and adjacent to the dust collection means to minimize air flow through said second building structure to the dust collection means when the car is being dumped and adapted to be opened to permit access to the front side of the hopper pit when dumping has ceased.

8. The dust containment system of claim 5 wherein the second building structure includes adjustable louver style damper means to permit selective air flow into said second building structure and said dust collection means.

9. A dust containment system for a bottom dumping railroad car of the open top, hopper type used to transport dusty, particulate materials, said system comprising:

an open railroad track segment for supporting the bottom dump car;

a building structure surrounding said track segment and including a roof having ventilator means therein;

a hopper pit situated beneath the track segment and adapted to receive particulate material dumped from said car, said hopper pit defined by spaced sidewalls, a rear wall and a front side;

floor means positioned between said building structure and said hopper pit and extending along opposite sides of said track segment, said floor means having air passageways formed therein;

damper means positioned along said air passageways; and dust collection means including fan means communicating with said hopper pit to induce an air draft through the ventilator means of the building structure downwardly through said air passageways, open track segment and through said hopper pit whereby fugitive dust generated during dumping is entrained in said induced air draft and captured by said dust collection means.

10. The dust containment system of claim 9 including a fixed air impermeable barrier positioned between the dust collection means and the open front side of the hopper pit, said barrier extending from said floor means downwardly into said hopper pit whereby said barrier causes the air draft to reverse direction prior to entering the dust collection means.

11. The dust containment system of claim 9 including duct means extending beneath the track segment in said hopper pit to provide an air pathway from a rear air passageway to the front side of said hopper pit.

12. The dust containment system of claim 10 wherein the dust collection means comprises a plurality of dust collector units having fabric dust filters with compressed air, reverse flow cleaning means associated therewith.

13. The dust containment system of claim 10 including a second building structure containing a space communicating with the open front side of the hopper pit whereby fugitive dust generated during removal of dumped particulate material in said hopper pit is contained within said second building structure and captured by the dust collection means.

14. A dust containment system for a bottom dumping railroad car of the open top, hopper type used to transport dusty, particulate materials, said system comprising:

an open railroad track segment for supporting the bottom dump car;

a first building structure surrounding said track segment and including a roof having ventilator means therein;

a hopper pit situated beneath the track segment and adapted to receive particulate material dumped from said car, said hopper pit defined by spaced sidewalls, a rear wall and an open front side;

floor means positioned between said building structure and said hopper pit and extending along opposite sides of said track segment, said floor means having air passageways formed therein;

damper means associated with said air passageways;

dust collection means including fan means communicating with said hopper pit to induce an air draft through the ventilator means of the building structure downwardly through said air passageways, open trackway and through said hopper pit whereby fugitive dust generated during dumping is entrained in said induced air draft and captured by said dust collection means;

a second building structure containing a space communicating with the open front side of the hopper pit whereby fugitive dust generated during removal of dumped particulate material in said hopper pit is contained within said second building structure and captured by the dust collection means; and including duct means extending beneath the track segment in said hopper pit to provide an air pathway from a rear air passageway to the open front side of said hopper pit.

15. The dust containment system of claim 14 wherein the hopper pit includes a moveable gate means positioned at a lower portion thereof, said gate means being adapted to contain particulate material within the hopper pit when said gate means is in a closed position and to permit access to said particulate material when the gate means is in a raised position.

16. A dust containment system for a bottom dumping railroad car of the open top, hopper type used to transport dusty, particulate materials, said system comprising:

an open railroad track segment for supporting the bottom dump car;

a first building structure surrounding said track segment and including a roof having ventilator means therein;

a hopper pit situated beneath the track segment and adapted to receive particulate material dumped from said car, said hopper pit defined by spaced sidewalls, a rear wall and an open front side;

floor means positioned between said building structure and said hopper pit and extending along opposite sides of said track segment, said floor means having air passageways formed therein;

damper means associated with said air passageways;

dust collection means including fan means communicating with said hopper pit to induce an air draft through the ventilator means of the building structure downwardly through said air passageways, open trackway and through said hopper pit whereby fugitive dust generated during dumping is entrained in said induced air draft and captured by said dust collection means;

a second building structure containing a space communicating with the open front side of the hopper pit whereby fugitive dust generated during removal of dumped particulate material in said hopper pit is contained within said second building structure and captured by the dust collection means; and including a moveable air impermeable curtain positioned at a forward portion of said second building structure and adjacent to the dust collection means to close off air flow through said second building structure to the dust collection means when the car is being dumped and adapted to be opened to permit access to the hopper pit when dumping has ceased.

17. The dust containment system of claim 14 wherein the second building structure includes louver means to permit selective air flow into said second building structure and said dust collection means.

18. The dust collection system of claim 14 wherein the particulate material is fly ash.

* * * * *